United States Patent [19]

Whittle et al.

[11] 4,426,399

[45] Jan. 17, 1984

[54] PREPARATION OF A DEHYDRATED PORK RIND PRODUCT

[75] Inventors: Clive R. Whittle, Claverley; Mark T. Whittle, Bridgnorth; Timothy J. M. Treharne, East Grinstead, all of England

[73] Assignee: Protein Foods (U.K.) Limited, England

[21] Appl. No.: 331,297

[22] Filed: Dec. 16, 1981

[30] Foreign Application Priority Data

Jan. 2, 1981 [GB] United Kingdom ............... 8100005

[51] Int. Cl.$^3$ ........................... A23L 1/27; A23L 1/31
[52] U.S. Cl. .................................. 426/265; 426/646; 426/647
[58] Field of Search ............... 426/265, 641, 646, 647, 426/652, 657, 456, 464, 266

[56] References Cited

U.S. PATENT DOCUMENTS

| 3,793,467 | 2/1974 | Bundus et al. | 426/641 X |
| 3,873,736 | 3/1975 | Palmer et al. | 426/647 X |
| 3,922,377 | 11/1975 | Whittle | 426/646 X |
| 4,119,742 | 10/1978 | Stupec | 426/641 |
| 4,262,022 | 4/1981 | Christensen et al. | 426/657 X |

FOREIGN PATENT DOCUMENTS 54-17158  2/1979  Japan ................... 426/646

OTHER PUBLICATIONS

Ostetag, "Zeitschrift fur Fleisch-und Milchhygiene", pp. 6–8, Berlin, 1938.
"Die Fleischwirtschaft", vol. 8, p. 81, 1956.

Primary Examiner—Arthur L. Corbin
Attorney, Agent, or Firm—Bacon & Thomas

[57] ABSTRACT

A blood-containing rind product is described. The product is a dehydrated haemoglobin-containing pork rind product having a moisture content of less than 15% and a haemoglobin content of up to 50% by weight, which product is substantially color-stable when subsequently thermoprocessed, this being a great advantage from the point of view of the consumer. The product preferably contains less than 25% fat and preferably has a particle size less than 5 mm although larger comminutable particles are possible.

The invention also includes a process for the preparation of the product by rehydrating a previously dehydrated pork rind product in a blood-containing liquid, followed by a dehydration step, preferably at above 70° C. and preferably under a vacuum. Additional fats may be included.

The product may be blended with foodstuffs and is substantially color-stable when done so and subsequently thermoprocessed. Foodstuffs containing the product of the invention in both dehydrated and rehydrated forms are also disclosed.

11 Claims, No Drawings

PREPARATION OF A DEHYDRATED PORK RIND PRODUCT

This invention relates to improvements in or relating to food products containing blood. More particularly it relates to a pork rind product containing blood in a stabilised form.

A considerable volume of animal blood is produced each day world-wide when animals are slaughtered for human food. This blood is a useful commodity, being a valuable source of protein and minerals and many uses for it have been found. Much of the blood obtained on slaughtering is split into two fractions. The white blood cell fraction, commonly called plasma, comprises about 60% of the total blood and contains about 7% by weight protein. It is used in the pharmaceutical, meat and other food industries. The other fraction is the haemoglobin, or red cell fraction, it comprises about 40% of the whole blood, and contains about 35% by weight protein. This is a valuable source of protein, minerals and iron.

Problems have always surrounded the use of the red cell and whole blood in a wide range of foodstuffs due mainly to its ability to create colour problems, that is, darkening of the food product and a red smearing, in particular of the fats, in any fat-containing product in which it is used. It will produce an almost black coloration on heating which is unattractive to the human consumer in most products. Much of this red cell fraction and whole blood has therefore either been consigned to use in pet foods and fertilisers or has been wasted. Although attempts have been made to stabilise the blood coloration and eliminate the colouring problem by various means so as to make this fraction or whole blood acceptable for human use, all have proved to be either completely unsatisfactory, or too expensive, or not the total answer. One example of the latter is a fat emulsion comprising blood, liquid animal fats, and caseinates or other emulsifiers.

In British Patent Specification No. 1,420,960, which corresponds to U.S. Pat. No. 3,922,377, dehydrated, gelatin-stable bacteriologically stable rind products are described. We have now found that if any such product is rehydrated in blood or a blood-containing solution of either red cell or whole blood, the red cell or blood is absorbed readily by the dehydrated rind and the resulting blood rind product may be again dehydrated to produce a product, able to be comminuted to form a powder, which varies in colour between a browny-pink and a very dark red depending on the blood concentration and the temperature at which it is dehydrated. The resulting product is again stable, will substantially not darken in colour during subsequent rehydration, utilisation and thermoprocessing, but will give an acceptable coloured particle for inclusion in meat products.

In addition to these advantages, which are of great value to manufacturers and merchants of meat, especially comminuted meat products, the product is extremely valuable as a nutritional supplement, being extremely high in protein and minerals.

The blood is stabilised in the product and, depending on the amount of blood used to rehydrate the rind, the combination of the rind protein and the blood constituents can lead to a product which, when rehydrated, is similar in several respects to red meat.

Accordingly, we provide a dehydrated bacteriologically stable pork rind product containing less than 15% by weight of water, and up to 50% by weight of haemoglobin. The product for inclusion in meat products will generally have a particle size of less than 5 mm. However, larger size products may be of value, e.g. for bulk shipment prior to comminution.

The haemoglobin range is capable of being varied to suit the desired use of the product. For certain applications, a very dark particle of high haemoglobin content is possible whereas for lighter coloured products, a lower haemoglobin content will be preferred. Generally speaking, the haemoglobin content will desirably be above 10% since below this level economic factors have a bearing and the energy involved in preparing the material is not justified by the extra nutritional value. A haemoglobin range of from 10 to 40%, for example 15 to 30%, is preferred.

In general, the dehydrated product will have a fat content of less than 25% by weight. However, under certain circumstances depending on the desired use, a fat content in excess of 25% is possible.

The water and fat contents may simply be assayed by methods known in the art and described in the above-mentioned British Patent Specification. The haemoglobin, or iron content may be assayed by atomic absorption spectroscopy AOC method (1980) 2.109.

The water content is typically in the range 4 to 9% by weight and the fat content generally from 4 to 20% by weight, depending either on the part of the pig from which the rind is obtained or on the amount of fat which may be removed from the rind prior to dehydration, and the amount removed during dehydration.

The dehydrated rind product is mainly protein, this typically constituting between 70 and 96% by weight as calculated from the nitrogen content. This may be assayed in a conventional manner, and a nitrogen conversion factor of 5.62 is appropriate for the material in view of the collagen content.

The particle size is of importance to the properties of the product when intended for use in meat products. For most purposes, in order to combine rapid rehydration of the product during its use with ease of handling a particle size in the range 0.5 to 3.0 mm is preferable. Smaller particle sizes may be advantageous when the dehydrated product is to be included in dried meat products, soups and prepared foods.

The product of the invention may be incorporated in food products either in the dehydrated state, in which case it will absorb moisture from the foodstuff mix, or in a rehydrated form. Foodstuffs containing the product of the invention in dehydrated form or in a rehydrated form are included within the scope of the invention. It may occasionally be possible to include a simple haemoglobin containing rehydrated pork rind product in certain foodstuffs and this is still part of the invention. In any event, there will generally be from 5 to 15% of the rehydrated product of the invention, calculated on the weight of meat, in the foodstuff. The product may of course be blended with other additives, stabilisers and emulsifiers employed in the food processing art, e.g. animal proteins, vegetable proteins or products associated with or added to meat products and products containing meat.

We further provide a process for the preparation of a dehydrated haemoglobin-containing pork rind product of the invention which comprises rehydrating a gelatin-stable dehydrated pork rind product for at least a portion of the rehydration time in a haemoglobin-containing solution, for example blood or a diluted solution thereof, and then dehydrating the rehydrated product obtained whereby a product having a water content of less than 15% by weight and a haemoglobin content of up to 50% by weight is obtained, followed optionally by comminution to a particle size of less than 5 mm.

The term "gelatin-stable" as used herein means that the dehydrated product used as starting material is substantially unable to gelatinise, i.e. to form a gel, on rehydration. This characteristic is substantially unaffected by the process used to manufacture the product of this invention and so the product of this invention is also substantially gelatin-stable.

The rehydration step will desirably be carried out at around ambient temperature, for example at from 5° to 25° C. e.g. at around 15° to 20° C. Rehydration may be carried out using whole blood or a diluted solution, for example of blood and water. The rehydration time will depend upon the particle size of the dehydrated product being rehydrated, the temperature, and the concentration of the blood solution, but will generally be complete with 5 minutes for a comminuted starting material.

It is preferred to use a diluted blood solution for the rehydration. Natural blood itself or even the red cell fraction may be used but is fairly thick, and so to speed up rehydration it is preferred to use an aqueous solution of blood at a dilution of from 2:1 to 1:5 by volume, calculated on blood:water. The dilution may be varied depending on the concentration of haemoglobin or whole blood it is desired to attain in the product. A generally useful mixture for rehydration has been found to be 1:1:1 of blood:water:dehydrated rind by weight, though mixtures comprising, for example, 2:1:1 through to 1:5:1 may be employed. The use of such mixtures will typically provide haemoglobin contents in the final product of from 27% to 15%. The blood employed will generally be animal or mammalian blood, e.g. from livestock, such as pigs, cattle and sheep or whales.

When the desired amount of rehydration has occurred, dehydration may be effected, most preferably at a temperature of 70° C. or above, e.g. up to about 120° C., and optionally, but most preferably under vacuum, e.g. below about 5 mm Hg. This stabilises the haemoglobin in the rind. The dehydration may be effected in air or oil or using a combination of air and oil-drying methods. If desired, part of the dehydration may be effected at reduced pressure and part at atmospheric pressure.

Tests carried out using the product of the invention have shown that if the dehydration is carried out at around 70° C. or greater, the blood is stabilised to the extent of being able to be thermoprocessed in comminuted products without unacceptable darkening, without leaching of the haemoglobin and therefore without producing colour smear. The product is substantially colour-stable therefore.

If, however, dehydration is carried out below 70° C., a small amount of soluble haemoglobin may be released on subsequent rehydration and thermoprocessing. Depending on the intended use of the product, this might still be acceptable.

The pork rind product employed to prepare the product of this invention may be a product of British Patent Specification No. 1,420,960, which has a particle size of less than 5 mm, or may be a dehydrated pork rind as is described in the said specification having the moisture and fat contents of the order of those of such a product but having a particle size in excess of 5 mm. It is for this reason that comminution may be desirable once rehydration and dehydration have been effected if it is desired to reduce the particle size of the final product to less than 5 mm.

It is possible to incorporate other materials in the rehydrated material prior to dehydration. Emulsifiers for fats, e.g. phosphates, nitrates and lard itself can be incorporated and the mixture then dehydrated as described above. If lard is incorporated in the mixture prior to dehydration, the fat content of the resulting product could be in excess of 25% and the product will have a slightly greasier consistency. An amount of lard up to a maximum of 15% based on the rehydrated product weight may be added, and more normally about 6 to 7%.

The invention will now be more particularly described in the following Example, which should not be considered as limiting. All temperatures are in °C.

EXAMPLE (a) A dehydrated gelatin-stable rind product of low particle size sold under the trademark 'Drinde' by Protein Foods (U.K.) Limited, Tipton, Staffordshire, England was obtained. 100 g of this was rehydrated with agitation in approximately 200% of its own weight of a 1:1 solution of cow blood:water at ambient temperature (20°). Absorption of the blood solution is total.

(b) The rehydrated rind product prepared in (a) was dehydrated under a vacuum at 0.5 mm Hg and a temperature of 75°. A dark reddish-brown powder was obtained, weighing about 130 g. This powder contains of the order of 15% haemoglobin. This powder may be stored at ambient temperature.

A typical sample of this powder as an average analysis contained

| Moisture | 5.7% |
|---|---|
| Fat | 13% |
| Protein | 79.6% |

The powder may be incorporated into most comminuted meat products at a level of 1–5% by weight. The product may, for example, be included in comminuted products of the sausage-type, e.g. salamis, in the dehydrated state, and moisture will be absorbed from the meat mix, water being added if appropriate, as described below. The product is commonly rehydrated at a ratio of 1:4 of powder:water and will be evident in the finished meat product as translucent reddish-brown particles.

(c) The rind product produced according to (b) may be used in the manufacture of a comminuted meat product, such as a pork-containing sausage, as follows:

| Lean pork meat | 9.5% |
|---|---|
| Dehydrated rind/blood product of (b) | 1.3% |
| Pork belly | 25% |
| Pork fat | 11% |
| Beef flank | 13% |
| Seasoning | 2.675% |
| Sodium polyphosphate | 0.325% |
| Rusk | .9% |
| Farina | 2% |
| Sodium caseinate | 2% |
| Milk powder | 1% |
| Water | 25.2% |

We claim:

1. A process for the preparation of a dehydrated pork rind product containing haemoglobin which comprises rehydrating a gelatin-stable dehydrated pork rind product, for at least a portion of the rehydration time, in a haemoglobin-containing solution, and then dehydrating the haemoglobin-containing rehydrated product obtained, whereby a product having a water content of less than 15% by weight and a haemoglobin content of up to 50% by weight is obtained.

2. The process of claim 1 wherein rehydration of one part of the dehydrated rind starting material is carried out in blood or an aqueous solution of blood at a dilution of from 2:1 to 1:5 parts by volume blood:water.

3. The process of claim 2 wherein the rehydration takes place at a temperature of from 5° to 25° C.

4. The process of claim 2 wherein the mixture for rehydration comprises blood:water:dehydrated rind by weight, in the ratio of from 2:1:1 through to 1:5:1.

5. The process of claim 4 wherein the haemoglobin content in the final product is from 15 to 27%.

6. The process of claim 1 wherein dehydration is carried out at 70° C. or above.

7. The process of claim 6 wherein dehydration is carried out under vacuum.

8. The process of claim 6 wherein the temperature is from about 70° to about 120° C.

9. The process of claim 1 wherein dehydration is carried out using air, oil or a combination of air and oil-drying methods.

10. The process of claim 1 wherein an emulsifier and lard are incorporated into the rehydrated product prior to dehydration.

11. The process of claim 1 wherein comminution of the product to a particle size of less than 5 mm is carried out after dehydration.

* * * * *